(12) United States Patent
Haltakov et al.

(10) Patent No.: US 11,587,443 B2
(45) Date of Patent: Feb. 21, 2023

(54) METHOD FOR CONTROLLING A VEHICLE, AND CONTROL APPARATUS FOR A VEHICLE

(71) Applicant: Bayerische Motoren Werke Aktiengesellschaft, Munich (DE)

(72) Inventors: Vladimir Haltakov, Munich (DE); Pascal Minnerup, Unterschleissheim (DE); Daniel Niehues, Munich (DE); Maxi Winter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/719,462

(22) Filed: Apr. 13, 2022

(65) Prior Publication Data

US 2022/0335831 A1    Oct. 20, 2022

(30) Foreign Application Priority Data

Apr. 15, 2021   (DE) ...................... 10 2021 109 425.9

(51) Int. Cl.
*G08G 1/16*   (2006.01)
*B60Q 9/00*   (2006.01)

(52) U.S. Cl.
CPC ............. *G08G 1/166* (2013.01); *B60Q 9/008* (2013.01)

(58) Field of Classification Search
CPC ................................ G08G 1/166; B60Q 9/008
USPC ........................................................ 340/904
See application file for complete search history.

(56) References Cited

U.S. PATENT DOCUMENTS

| | | | | |
|---|---|---|---|---|
| 5,612,699 A * | 3/1997 | Yamada | .................. | G01S 7/412 342/70 |
| 8,075,029 B2 * | 12/2011 | Takahashi | ............. | B60R 19/483 293/121 |
| 9,997,075 B2 * | 6/2018 | Ono | ......................... | G01S 17/89 |
| 10,017,111 B2 * | 7/2018 | Kunkel | .................. | B60Q 9/008 |
| 10,410,074 B2 * | 9/2019 | Miller | .................. | G06V 20/584 |
| 11,218,850 B2 * | 1/2022 | Liu | ......................... | G08G 1/166 |
| 2003/0218564 A1 * | 11/2003 | Tamatsu | ................ | G01S 13/931 342/107 |

(Continued)

FOREIGN PATENT DOCUMENTS

| | | |
|---|---|---|
| DE | 10 2012 211 391 A1 | 1/2014 |
| DE | 10 2015 209 467 A1 | 11/2016 |
| DE | 10 2018 207 869 A1 | 11/2019 |

OTHER PUBLICATIONS

German-language Search Report issued in German Application No. 10 2021 109 425.9 dated Sep. 29, 2021 with partial English translation (10 pages).

*Primary Examiner* — Kerri L McNally
*Assistant Examiner* — Thang D Tran
(74) *Attorney, Agent, or Firm* — Crowell & Moring LLP

(57) ABSTRACT

A method for controlling a first vehicle, travelling on a road, that has a second vehicle travelling ahead of it, includes the steps of: scanning the second vehicle from the first vehicle by use of multiple sensors; providing individual determinations, each on the basis of scans by only one of the sensors, concerning whether the first and the second vehicle are travelling in the same lane of the road, wherein each sensor has an associated determination certainty; and providing a collision warning if a product of the determination certainties is below a predetermined threshold value.

14 Claims, 2 Drawing Sheets

(56) References Cited

U.S. PATENT DOCUMENTS

| | | | | |
|---|---|---|---|---|
| 2004/0230375 | A1* | 11/2004 | Matsumoto | B60T 8/17557 |
| | | | | 348/148 |
| 2007/0075850 | A1* | 4/2007 | Lucas | G08G 1/166 |
| | | | | 340/435 |
| 2007/0106475 | A1* | 5/2007 | Kondoh | G06V 20/58 |
| | | | | 340/436 |
| 2010/0253493 | A1* | 10/2010 | Szczerba | G02B 27/01 |
| | | | | 345/593 |
| 2014/0236414 | A1* | 8/2014 | Droz | G08G 1/015 |
| | | | | 701/1 |
| 2015/0025784 | A1* | 1/2015 | Kastner | B60W 30/0956 |
| | | | | 701/119 |
| 2015/0112509 | A1* | 4/2015 | Fujita | B60W 30/00 |
| | | | | 701/1 |
| 2015/0166071 | A1 | 6/2015 | Komar et al. | |
| 2016/0116583 | A1* | 4/2016 | Fukuman | G01S 7/527 |
| | | | | 342/59 |
| 2016/0200321 | A1* | 7/2016 | Yamada | B60W 10/18 |
| | | | | 701/96 |
| 2017/0137025 | A1* | 5/2017 | Muto | B60W 30/18154 |
| 2017/0166207 | A1* | 6/2017 | Darms | B60W 30/165 |
| 2017/0197551 | A1* | 7/2017 | Lee | B60W 30/0953 |
| 2018/0075741 | A1* | 3/2018 | Bidner | G01S 17/86 |
| 2018/0173970 | A1 | 6/2018 | Bayer et al. | |
| 2018/0329418 | A1* | 11/2018 | Baalke | B60W 30/0956 |
| 2019/0009787 | A1* | 1/2019 | Ishioka | G08G 1/166 |
| 2019/0047559 | A1* | 2/2019 | Conde | G05D 1/0088 |
| 2019/0064839 | A1* | 2/2019 | Sakai | G05D 1/0289 |
| 2019/0353498 | A1 | 11/2019 | Eigel et al. | |
| 2020/0039515 | A1* | 2/2020 | Sasaki | B60W 30/18145 |
| 2020/0064483 | A1* | 2/2020 | Li | G01S 7/4026 |
| 2020/0099824 | A1* | 3/2020 | Benemann | G01S 7/4972 |
| 2020/0117200 | A1* | 4/2020 | Akella | G05D 1/0088 |
| 2020/0149885 | A1* | 5/2020 | Kamei | G01B 11/245 |
| 2020/0175872 | A1* | 6/2020 | Sakurada | G08G 1/0112 |
| 2020/0278419 | A1* | 9/2020 | Borosak | G01S 13/34 |
| 2020/0283015 | A1* | 9/2020 | Yashiro | G05D 1/0257 |
| 2020/0298844 | A1* | 9/2020 | Ikuta | G01S 13/931 |
| 2020/0298853 | A1* | 9/2020 | Bast | G08G 1/166 |
| 2020/0398743 | A1* | 12/2020 | Huber | G06K 9/6256 |
| 2021/0035442 | A1* | 2/2021 | Baig | G08G 1/0112 |
| 2021/0094472 | A1* | 4/2021 | Frazier | B60Q 9/008 |
| 2021/0096262 | A1* | 4/2021 | Vets | G01S 7/484 |
| 2021/0124956 | A1* | 4/2021 | Takamatsu | G08G 1/0104 |
| 2021/0269065 | A1* | 9/2021 | Haggblade | B60W 30/18154 |
| 2021/0271249 | A1* | 9/2021 | Kobashi | G08G 1/166 |
| 2021/0287546 | A1* | 9/2021 | Englander | B60Q 5/006 |
| 2022/0105929 | A1* | 4/2022 | Takei | B60W 30/0956 |
| 2022/0118970 | A1* | 4/2022 | Takaki | B60Q 9/008 |
| 2022/0156533 | A1* | 5/2022 | Hu | G01S 17/931 |
| 2022/0176952 | A1* | 6/2022 | Nanri | G08G 1/166 |
| 2022/0178703 | A1* | 6/2022 | Hiroyuki | G01C 21/3658 |
| 2022/0299860 | A1* | 9/2022 | Wang | G03B 37/00 |

\* cited by examiner

METHOD FOR CONTROLLING A VEHICLE, AND CONTROL APPARATUS FOR A VEHICLE

CROSS REFERENCE TO RELATED APPLICATION

This application claims priority under 35 U.S.C. § 119 from German Patent Application No. DE 10 2021 109 425.9, filed Apr. 15, 2021, the entire disclosure of which is herein expressly incorporated by reference.

BACKGROUND AND SUMMARY

The invention relates to the control of a vehicle. In particular, the invention relates to the control of a vehicle when travelling past another vehicle that is in a different lane of the same road.

A vehicle travels in a lane of a multilane road, for example a freeway. The vehicle can be controlled partially or fully automatically in the longitudinal and/or transverse direction, which means that a driver is relieved of burden for the control of the vehicle. When the vehicle approaches a vehicle travelling ahead, it can travel past said vehicle if the vehicles are in different lanes. Otherwise, when it is within a predetermined minimum distance, the first vehicle must either be decelerated or taken into a different lane.

To determine whether the vehicles are in the same lane or in different lanes, various determinations can be carried out. By way of example, the vehicle in front can be scanned from the rear by means of various sensors in order to determine the lateral position of said vehicle in relation to the road. This determination usually needs to be effected with an error of less than one meter, which can be difficult in the case of a greater distance of for example 100 meters or more.

If multiple sensors are used, the scans by said sensors can be fusioned with one another in order to determine the position of the vehicle more accurately. A determination certainty indicating the probability with which the determined position is within a predetermined error range can likewise be increased thereby. However, this scarcely allows detection of when one of the sensors provides poor or unusable data. The determination certainty may thus not reach a predetermined value even if sufficiently good data are actually available to determine the position with the required accuracy.

An object on which the invention is based is to provide an improved technique for reliably positioning a vehicle from a vehicle behind. The invention achieves the object by means of the subjects of the independent claims. Dependent claims reproduce preferred embodiments.

According to a first aspect of the invention, a method for controlling a first vehicle, travelling on a road, that has a second vehicle travelling ahead of it comprises steps of scanning the second vehicle from the first vehicle by way of multiple sensors; providing individual determinations, each on the basis of scans by only one of the sensors, concerning whether the first and the second vehicle are travelling in the same lane of the road; wherein each sensor has an associated determination certainty; and providing a collision warning if a product of the determination certainties is below a predetermined threshold value.

According to the invention, determination certainties are first determined for each of the sensors individually. Scans by a sensor whose associated determination certainty does not exceed a predetermined limit cannot be considered for determining the lane of the second vehicle. As such, the determination certainty for the lane determined on the basis of all the remaining scans may be above the threshold value even if one of the sensors provides no scans or only poor scans. Additionally, it is possible to determine in a dedicated manner for scans by each of the sensors whether or not their scans are found to be sufficiently good. As such, it is possible to make an adjustment to match specific properties of each sensor. By way of example, the scans may be noisy or provided with a systematic error, or the sensor may be prevented from scanning the second vehicle, for example by an interposed obstacle.

All of the determination can take place redundantly, which means that an availability of the determination may be high. The determination can still be performed at the same level of certainty even if a sensor or validator fails. The technique described also permits later addition of further sensors or validators that can use new heuristics for determination.

The technique described herein can be used to automatically control the first vehicle in an improved manner. Action by a driver may be necessary less often or not at all now. Safety for the two vehicles and the occupants thereof can be increased.

The collision warning is preferably also provided if it is determined, based on the individual determinations, that the first and the second vehicle are travelling in the same lane of the road. The collision warning can thus be provided whenever it is not possible to determine with sufficient certainty that the vehicles are in different lanes. The absence of a collision warning can indicate a safe possible overtaking maneuver by the first vehicle in respect of the second vehicle if the two vehicles follow their lanes. It is assumed in this case that the first vehicle is travelling faster than the second.

A determination certainty for an individual determination can be determined on the basis of the scans by the associated sensor. As such, it is possible to ensure that the scans are at least largely independent of one another, which is a prerequisite for correctly forming the overall determination certainty as the product of the individual determination certainties. By way of example, scans by a sensor can be taken as a basis for determining whether said sensor was actually able to detect the second vehicle, what positioning error can be expected on the basis of a distance between the vehicles, what level of noise there is in the scans or whether the second vehicle can be attributed to one of the lanes sufficiently reliably.

The scans by different sensors can be substantially independent of one another. To this end, the sensors can use different measurement principles or be based on different heuristics. By way of example, a first sensor in the form of a camera can scan the second vehicle and a marking of the lanes on the road, while a second sensor in the form of a LiDAR sensor can observe whether a third vehicle travelling in the same lane as the first successfully passes the second.

The determination certainties may be categorized into predetermined levels. This allows improved determination of whether or not a determination certainty meets predetermined requirements; additionally, the whole determination certainty can be checked in an improved manner for whether it reaches the predetermined threshold value.

In a further embodiment, an individual determination is carried out with reference to information on a geographical map, wherein the determination certainty of the individual determination is not determined to be greater than a determination certainty of the map. It is thus possible to avoid determining a high determination certainty that may be based unnoticed on a large map error. This limitation does not need to be borne in mind for sensors whose scans are not supported by map data.

The threshold value can be determined on the basis of a driving state of the first vehicle. The threshold value can in particular be adjusted to match a possible effect of a collision between the vehicles. If a damaging effect to be expected in the event of a collision is great, then the threshold value may be increased in order to avert the occurrence of the damage with greater certainty. If for example a speed of travel of the first vehicle is high, in particular compared to a speed of travel of the second vehicle, then the threshold value may be higher than for slow travel. In further embodiments, it is also possible to consider which collision avoidance means are still available. If, in a further example, the road is slippery, then emergency braking to avert a collision can result in less deceleration than when the road is dry. In this case, the threshold value can likewise be raised in order to permit an overtaking maneuver only when the use of different lanes is determined very reliably.

Accordingly, the limit that a determination certainty of an individual determination needs to exceed in order for the scans to be considered for determining the position of the second vehicle can also be dynamically matched to a driving state. The driving state can also include weather influences, a coefficient of friction with respect to a ground, cornering or existing visibility.

Scans by the sensor can be processed by means of predetermined heuristics. A sensor can comprise in particular one from a camera, a LiDAR sensor (grid fusion), a landmark positioner (similar to grid fusion, but with landmarks), a grid occupancy determiner (occupancy grid) and a lane course estimator (collective road course). The heuristics can process further information, in particular from a geographical map.

In one development, the first vehicle can be controlled on the basis of the collision warning. By way of example, a vehicle speed of the first vehicle can be automatically reduced in response to the collision warning. The reduction can take place on the basis of a distance between the vehicles and/or a determination certainty for the lanes. In a further embodiment, a change of lane by the first vehicle can be controlled.

In another development of the invention, it is possible to determine whether the lane used by the second vehicle is on a predetermined side of the lane used by the first vehicle, and the collision warning can also be provided if this is the case. It is thus possible to prevent the first vehicle from overtaking the second in a lane that is not permitted for this purpose. By way of example, it is possible to prevent overtaking on the right-hand side of the second vehicle, which is not permitted in Germany.

In yet another embodiment, if the determination certainty is only just below the threshold value, a deceleration strategy can be controlled in order to have more time before it is necessary to initiate a measure to avert a possible collision. If it is determined, based on the individual determinations, that the first and the second vehicle are travelling in different lanes of the road, and the product of the determination certainties is between the predetermined threshold value and a further predetermined, lower, threshold value, then the first vehicle can be decelerated only to the extent that its speed is still above the speed of the second vehicle.

A measure to avoid collisions, in particular slowing the first vehicle to or below the speed of travel of the second, or the first vehicle changing lane, can be deferred until a predetermined condition has arisen, for example the vehicles are within a predetermined distance. Should better scans by the sensors become available by this time, the determination certainty can increase and exceed the predetermined threshold value, which means that the second vehicle can be overtaken without risk.

The collision warning can be provided only if the first vehicle is travelling faster than the second. The collision warning can also be provided only if the vehicles are within a predetermined minimum distance of one another.

According to a further aspect of the present invention, a control apparatus for use aboard a first vehicle, travelling on a road, that has a second vehicle travelling ahead of it comprises multiple sensors, each for scanning the second vehicle; multiple validators, which are associated with the sensors in pairs; wherein a validator is configured to take scans by the associated sensor as a basis for providing an individual determination concerning whether the first and the second vehicle are travelling in the same lane of the road; wherein each sensor has an associated determination certainty; and a processing device for providing a collision warning if a product of the determination certainties is below a predetermined threshold value.

There may also be multiple validators for a sensor. By way of example, a camera can detect firstly lane markings and secondly other vehicles in order to estimate the lane course thereby. So that the two inputs can be treated as independent, shared error sources (dazzling, faulty camera) need to be treated separately, or to be sufficiently rare.

The processing device may be configured to perform a method as described herein wholly or in part. To this end, the processing device can comprise a programmable microcomputer or microcontroller and the method can be in the form of a computer program product containing program code means. The computer program product may also be stored on a computer-readable data storage medium. Features or advantages of the method can be transferred to the apparatus or vice versa.

According to yet another aspect of the present invention, a vehicle comprises a control apparatus as described herein. The vehicle may in particular correspond to a first vehicle as described herein. The first and/or the second vehicle preferably comprises a motor vehicle. Particularly preferably, the first vehicle comprises a passenger car or a motorcycle, and the second vehicle comprises a truck or bus.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
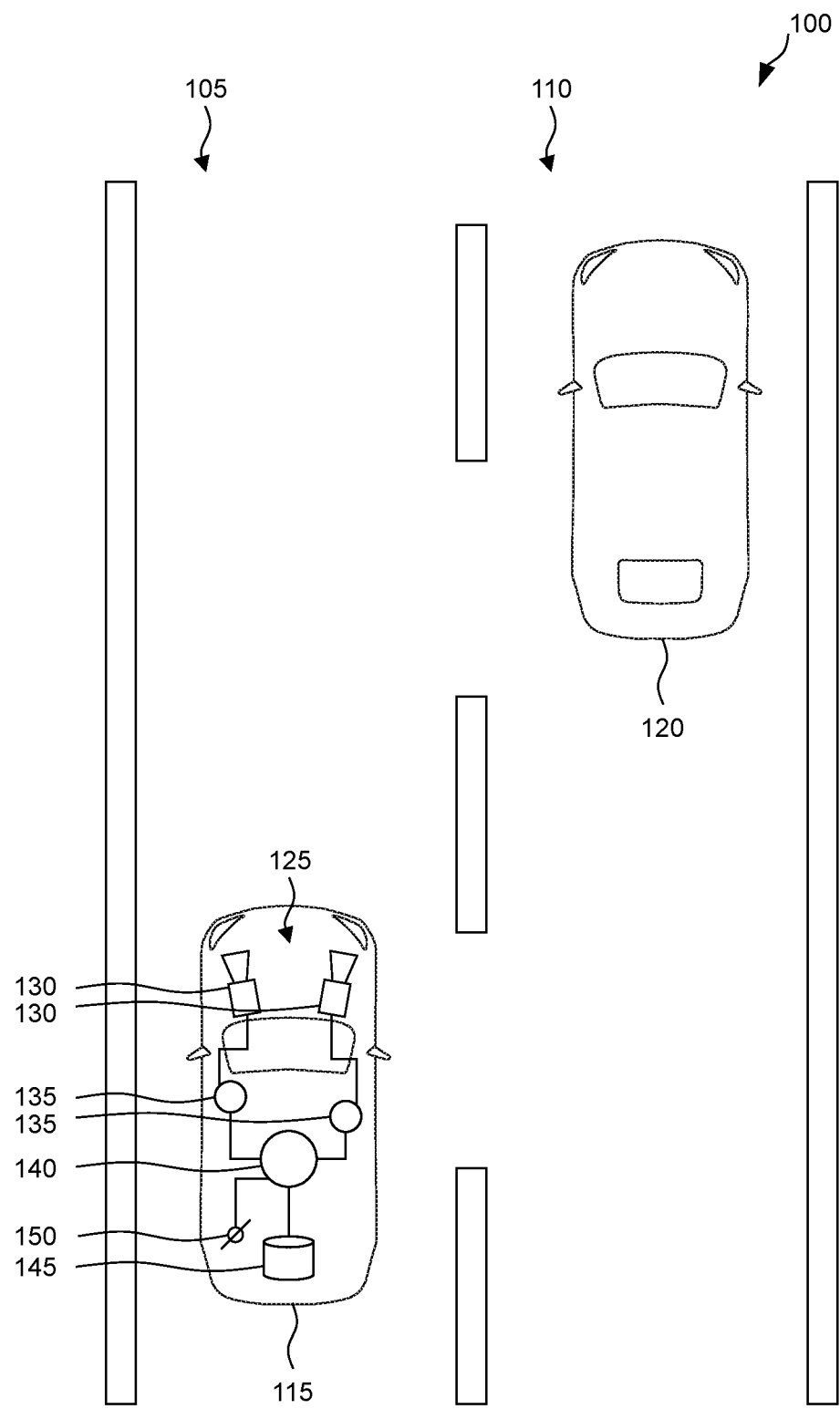
FIG. 1 illustrates two vehicles on a road.

FIG. 1 shows a road 100 having a first lane 105 and a second lane 110. In the first lane 105 there is a first vehicle 115, and in the second lane 110 there is a second vehicle 120. By way of example, the road 100 can comprise a freeway or a similar road expanded to multiple lanes and can optionally also have one or more further lanes. All of the lanes 105, 110 considered here permit travel in the same direction: from bottom to top in the depiction in FIG. 1. The vehicles 115, 125 preferably comprise motor vehicles, for example the first vehicle 115 being able to comprise a passenger car and the second vehicle 120 being able to comprise a slower vehicle, for example a small car or a truck.

Fitted aboard the first vehicle 110 is a control apparatus 125, which is configured to provide a collision warning if there may be a collision by the first vehicle 110 with the second vehicle 120 when the two are travelling in the same lane 105 or 110.

The control apparatus 125 comprises multiple sensors 130, each sensor 130 having an associated validator 135, and a processing device 140. A sensor 130 and a validator 135 associated therewith can be regarded as an information source. Different information sources can use the same sensor 130, but different validators 135. Preferably, an interface 145 for providing a collision warning is also included. In addition, there may be provision for a map memory 150 for receiving geographical surroundings information.

The sensors 130 can operate according to different physical principles. As such, different sensors 130 can comprise a camera, a LiDAR sensor or a radar sensor, for example. The associated validator 135 can be used to determine whether the second vehicle 120 is in the same lane 105, 110 as the first vehicle 115. To this end, further information from the surroundings can be scanned, for example a marking of a lane 105, 110, a further vehicle in the surroundings or a geographical position of the first vehicle 115. Each validator 135 is configured to determine, preferably without information from another validator 135, which lane 105, 110 the second vehicle 120 is in. Some validators 135 can resort to map information stored in the map memory 150. The validators 135 preferably use different heuristics for determination.

By way of example, a first sensor 130 can use a first validator 135 to optically check whether the second vehicle 120 is between lane markings that bound a lane 105 used by the first vehicle 115. By way of example, the first sensor 130 can comprise an optical camera. If the road 100 between the vehicles 115 and 120 describes a curve, then a maximum curvature can be assumed. The maximum curvature can comprise a worst value to be assumed (worst case) or an averagely poor value to be assumed (bad case). If the maximum curvature is chosen to be small, then the second vehicle 120 can be determined to be in the same lane 105, 110 as the first vehicle 115 more frequently than is actually the case (false positive). If the maximum curvature is chosen to be large, then the second vehicle 120 can be determined to be in the same lane 105, 110 as the first vehicle 115 less often than is actually the case (false negative). The maximum curvature allows a ratio between positive and negative errors of this validator 135 to be influenced.

A second sensor 130 can use a second validator 135 to perform a grid fusion. This involves an algorithm dividing the environs of the vehicle 115, 120 into small areas, so-called cells. For each cell, the algorithm determines whether it is vacant or occupied. If the cell is occupied by an object, the speed and direction of travel of said object are also determined. Finally, static and dynamic objects are separated from one another and provided together with the vacant space, e.g. for maneuver decisions or route planning.

A third sensor 130 can use an associated third validator to perform landmark fusion, which can operate similarly to grid fusion, but taking into consideration landmarks in surroundings of the vehicles 115, 120. This and the aforementioned variant can resort to information from the map memory 150.

A fourth sensor 130 can take the behavior of another road user as a basis for assessing whether the second vehicle 120 is in the same lane as the first vehicle 115. The fourth sensor 130 can comprise a camera, which also serves as input for another validator. The sensor 130 may also be combined with a radar and/or LiDAR sensor. In one embodiment, the fourth sensor 130 and the first and/or third sensor 130 may be identical. If for example another road user, whose lane 105, 110 in relation to that of the first vehicle 115 is known, overtakes the second vehicle 120, this can be used to infer whether or not the vehicles 115, 120 are in the same lane 105, 110.

The validators 135 can determine lateral positions of each of the vehicles 115, 120 in relation to a lane center of the lane 105, 110 being used. Should a vehicle 115, 120 not travel completely in the respective lane 105, 110 or change a lane 105, 110 being used, then allowance can be made for this elsewhere. To determine whether a vehicle 115, 120 is travelling in the first lane 105 or the adjacent second lane 110, a minimum width of the second vehicle 120 can be assumed, which can be approximately 190 cm. This width can be regarded as a margin of error that can be distributed over the lanes 105, 110. The split can be chosen to be asymmetric in order to adjust a ratio of false positive and false negative determinations. By way of example, an error budget of 150 cm can be chosen for the false negative determinations and one of 80 cm can be chosen for the false positive determinations. The split can be chosen for each pair of sensor 130 and validator 135 individually.

The validators 135 are additionally each configured to determine a determination certainty with which they were able to determine the lane 105, 110 used by the second vehicle 120. If this individual or discrete determination certainty is below a predetermined value, the determination can be rejected. Otherwise, the processing device 140 can determine the relative position of the second vehicle 120 in relation to the first 115 and can determine an overall or global determination certainty for this determination as the product of the individual determination certainties.

If it is determined that the vehicles 115, 120 are not using different lanes 105, 110 and/or that the overall determination certainty does not exceed a predetermined threshold value, it is not possible to ensure that the first vehicle can pass the second vehicle 120 in the lane 105 being used, and a collision warning can be provided.

Figure 2:
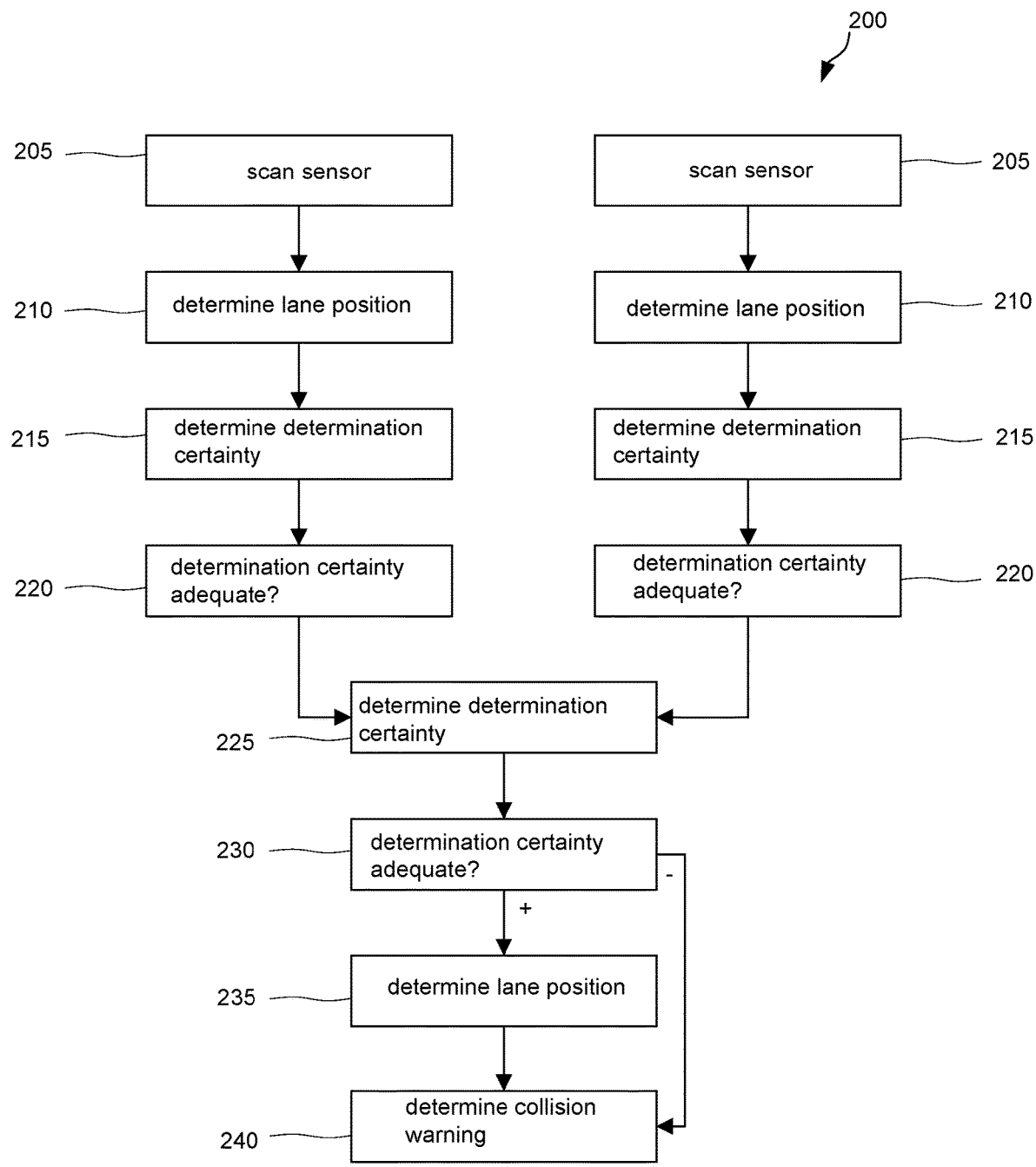
FIG. 2 illustrates a flowchart for a method.

FIG. 2 shows a flowchart for a method 200 for determining a risk of collision between vehicles 115 and 120. A scenario of the type shown in FIG. 1 is assumed in this case.

Steps 205 to 220 described below are usually performed independently of one another for different pairs of in each case one sensor 130 and one associated validator 135. For this reason, steps 205 to 220 are shown repeatedly in FIG. 2, but are described only once below by way of representation. It should be noted that steps 205 to 220 can be performed concurrently as often as there is provision for sensor/validator combinations 130, 135.

In a step 205, surroundings of the first vehicle 115 can be scanned by means of a sensor 130, the second vehicle 120 usually being situated in the scanned surroundings. In a step 210, a lane position of the second vehicle 120 can be determined. The lane position indicates whether the second vehicle 120 is in the same or a different lane 105, 110 as/than the first vehicle 105 and preferably also where this lane 105, 110 is in relation to the one being used by the first vehicle itself.

In a step 215, a determination certainty with which the lane position of the second vehicle 120 was determined in each case is determined. In a step 220, it is possible to determine whether the determination certainty exceeds a predetermined value. If this is not the case, the determination can be rejected.

Remaining determinations by the sensors 130 and validators 135 can then be processed further. In a step 225, a product of the individual determination certainties can be determined as the overall determination certainty. This indicates the determination certainty with which a lane position of the second vehicle 120 can be determined on the basis of the remaining determinations.

In a step 230, it is possible to determine whether the determined overall determination certainty exceeds a predetermined threshold value. If this is the case, the lane position can be determined in a step 235 on the basis of the determinations that are to be taken into consideration. If the determined lane position of the second vehicle 120 does not differ from the lane position of the first vehicle 105, a collision warning can be provided in a step 240. The collision warning can also be provided if it was determined in step 230 that the overall determination certainty does not exceed the threshold value.

The collision warning can be provided to a person, in particular a driver, aboard the first vehicle 115 and/or to a control apparatus for controlling the first vehicle 115. The control apparatus can take the collision warning as a basis for controlling the first vehicle in the longitudinal direction, by slowing said vehicle to the extent that it does not run into the second vehicle 120, or in the transverse direction, by performing a lane change to a vacant lane 105, 110. The two measures can also be combined with one another. The vacant lane 105, 110 can be determined by performing a technique as described herein for another vehicle in the surroundings.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SIGNS

100 road
105 first lane
110 second lane
115 first vehicle
120 second vehicle
125 control apparatus
130 sensor
135 validator
140 processing device
145 interface
150 map memory
200 method
205 scan sensor
210 determine lane position
215 determine determination certainty
220 determination certainty adequate?
225 determine determination certainty
230 determination certainty adequate?
235 determine lane position
240 determine collision warning

What is claimed is:

1. A method for controlling a first vehicle, travelling on a road, that has a second vehicle travelling ahead of the first vehicle, the method comprising:
    scanning the second vehicle with a first sensor of the first vehicle so as to generate a first scan, and with a second sensor of the first vehicle so as to generate a second scan;
    providing:
        a first determination, via the first sensor, of whether the first vehicle and the second vehicle are travelling in the same lane of the road based on the first scan, wherein the first determination is associated with a first certainty, and
        a second determination, via the second sensor, of whether the first vehicle and the second vehicle are travelling in the same lane of the road based on the second scan, wherein the second determination is associated with a second certainty; and
    providing a collision warning when a product of the first certainty and the second certainty is below a predetermined threshold value.

2. The method according to claim 1, wherein the collision warning is provided when it is determined, based on the first determination and the second determination, that the first and the second vehicle are travelling in the same lane of the road.

3. The method according to claim 1, wherein the first certainty is determined based on the first scan, and the second certainty is based on the second scan.

4. The method according to claim 1, wherein the first scan and the second scan are independent of one another.

5. The method according to claim 1, wherein the first certainty and the second certainty are categorized into predetermined levels.

6. The method according to claim 1,
    wherein is the first determination and the second determination are each carried out with reference to information on a geographical map, and
    wherein the first certainty and the second certainty are not determined to be greater than a determination certainty of the map.

7. The method according to claim 1, wherein the threshold value is determined on the basis of a driving state of the first vehicle.

8. The method according to claim 1, wherein one of the first sensor and the second sensor is: a camera, a LiDAR sensor, a landmark positioner, a grid occupancy determiner, and a lane course estimator.

9. The method according to claim 1, wherein the first vehicle is controlled on the basis of the collision warning.

10. The method according to claim 1, wherein the collision warning is provided when it is determined, based on the first determination and the second determination, that the lane used by the second vehicle is on a predetermined side of the lane used by the first vehicle.

11. The method according to claim 1, wherein when it is determined, based on the first determination and the second determination, that the first vehicle and the second vehicle are travelling in the same lane of the road and product of the first certainty and the second certainty lies between the predetermined threshold value and a further predetermined, lower, threshold value, then the first vehicle is decelerated to an extent that its speed is still above the speed of the second vehicle.

12. The method according to claim 1, wherein the collision warning is provided when the first vehicle is travelling faster than the second vehicle.

13. A control apparatus of a first vehicle, travelling on a road where a second vehicle is travelling ahead of the first vehicle, the control apparatus comprising:
- a first sensor configured to scan the second vehicle so as to generate a first scan;
- a second sensor configured to scan the second vehicle so as to generate a second scan;
- a first validator configured provide a first determination of whether the first vehicle and the second vehicle are travelling the same lane of the road based on the first scan, wherein the first determination is associated with a first certainty;
- a second validator configured to provide a second determination of whether the first vehicle and the second vehicle are travelling in the same lane of the road based on the second scan, wherein the second determination is associated with a second certainty; and
- a processing device configured to provide a collision warning when a product of the first certainty and the second certainty is below a predetermined threshold value.

14. A vehicle comprising a control apparatus according to claim 13.

* * * * *